United States Patent [19]

Takanashi

[11] Patent Number: 4,537,305

[45] Date of Patent: Aug. 27, 1985

[54] PACKAGE FOR STORAGE OF MEDICAL CONTAINER

[75] Inventor: Nobuyasu Takanashi, Fujinomiya, Japan

[73] Assignee: Terumo Kabushiki Kaisha, Tokyo, Japan

[21] Appl. No.: 670,660

[22] Filed: Nov. 9, 1984

Related U.S. Application Data

[63] Continuation of Ser. No. 426,216, Sep. 28, 1982, abandoned.

[30] Foreign Application Priority Data

May 6, 1982 [JP] Japan .................................. 57-74502

[51] Int. Cl.³ .............................................. B65D 81/20
[52] U.S. Cl. ...................................... 206/438; 206/484;
206/524.2; 206/524.6; 229/3.5 R; 428/35
[58] Field of Search .............. 206/363, 438, 439, 440,
206/484, 484.1, 484.2, 524.1, 524.2, 524.6, 557,
813, 828, 621; 229/3.5 R, 43; 428/35, 354,
475.8, 515; 156/69

[56] References Cited

U.S. PATENT DOCUMENTS

| 3,264,165 | 8/1966 | Stickel | 229/3.5 R |
| 3,274,004 | 9/1966 | Curler et al. | 229/3.5 R |
| 3,570,748 | 3/1971 | Coyle et al. | 229/3.5 R |
| 3,595,465 | 7/1971 | Vallancourt | 206/439 |
| 4,055,672 | 10/1977 | Hirsch et al. | 206/484 |
| 4,192,773 | 3/1980 | Yoshikawa et al. | 206/205 |
| 4,239,826 | 12/1980 | Knott, II; et al. | 428/475.8 |
| 4,256,784 | 3/1981 | Gebhardt et al. | 428/515 |
| 4,355,721 | 10/1982 | Knott, II; et al. | 206/524.2 |

Primary Examiner—William T. Dixson, Jr.
Assistant Examiner—Jimmy G. Foster
Attorney, Agent, or Firm—Frishauf, Holtz, Goodman & Woodward

[57] ABSTRACT

A package for the storage of a plastic medical container holding a medicinal fluid therein, which package comprises a tray part formed by laminating and molding an outer polyolefin layer, an intermediate layer capable of barriering passage of gases and steam and an inner polyolefin layer in the shape of a tray provided round the opening thereof with a flange portion, a lid member formed by laminating an inner polyamide layer, an intermediate layer capable of barriering passage of gases and steam and an outer layer of a resin possessed of thermal resistance enough to withstand the conditions of heat seal, and a hotmelt adhesive layer formed of materials of dissimilar melting points including at least one material identical with said polyolefin in one layer of said tray part and adapted to be inserted between said flange portion of said tray part and the corresponding portion of said lid member to serve as a medium for the flange portion and the lid member to b heat sealed peel openably.

16 Claims, 2 Drawing Figures

PACKAGE FOR STORAGE OF MEDICAL CONTAINER

This application is a continuation of application Ser. No. 426,216, filed Sept. 28, 1982, now abandoned.

BACKGROUND OF THE INVENTION

1. Field of the Invention:

This invention relates to a package for the storage of a plastic medical container. More particularly, this invention relates to a package for the storage of a plastic medical container such as a blood bag or a transfusion solution bag which contains therein a medicinal fluid.

2. Description of Prior Arts:

Plastic medical containers such as blood bag and transfusion bag contain therein anticoagulants such as ACD solution and CPD solution which serve to prevent the blood from being coagulated during collection or transfusion of blood. The medical containers containing such chemical solutions are stowed in tightly closed containers of synthetic resin designed exclusively for the purpose of storage. Since the medical containers are made of plastic materials and therefore are pervious to gases, there is a possibility that oxygen gas, for example, will penetrate through these containers and pass into the chemical solutions contained therein to cause oxidative degradation of the chemical solutions. The wetting components, particularly the moisture, present in the chemical solutions penetrate through the walls of the containers and add to the humidity within the packages. If aerobic microorganisms survive by some reason or other within the chemical solutions, there ensues an inevitable possibility that microorganisms, which collect on the surface of the containers between the time these containers are manufactured and the time they are put to use will gain in growth because of the heightened humidity.

It has been recently proposed to place a deoxidizer tightly closed containers to effect quick fall of the concentration of oxygen within the tightly closed containers and prevent the contents of the containers from oxidation. As a tightly closed container suited to the proposed prevention of its contents from oxidation, there has been proposed a bag shaped container which is obtained by vacuum depositing aluminum on the opposed surfaces of two superposed polyester type resin sheets and heat sealing the corresponding peripheries of the two sheets through the medium of a hot melt type adhesive agent (Japanese Published Unexamined Patent No. SHO 53(1978)-113693). Since the bag-shaped container is deficient in a shape-retaining property, the inner volume of the container decreases and the walls of the bag sink as the oxygen therein is gradually absorbed by the deoxidizer. When the contents held in the container and the walls of the container adhere fast to the surfaces of the deoxidizer, the absorption of oxygen by the deoxidizer fails to proceed at the expected rate and the concentration of oxygen in the container fails to fall to the prescribed level (less than 0.1%/50 hrs.), frequently with the result that microorganisms which by chance have found their way into the containers in the course of fabrication will enjoy growth in the presence of oxygen. Further, the bag-shaped container has an inferior shape-retaining property, it tends to inconvenience various handling works for storage. When such bag-shaped containers are piled up during storage or in transit, they collapse and bring about adverse effects upon their contents. When the container is molded three-dimensionally, since the conditions involved in the molding deform and crack the conventional barrier layers formed of aluminum, for example, to intercept gases and steam, the container is destitute of a gas barrier property.

It is, therefore, an object of this invention to provide a novel package for storage of a plastic medical container. Another object of this invention is to provide a package excelling in shape-retaining property, gas barrier property, and steam barrier property and used for the storage of a medical container holding a medicinal fluid therein. Yet another object of this invention is to provide a package excelling in heat sealability and peel openability and used for the storage of a medical container.

SUMMARY OF THE INVENTION

The objects described above are attained by a package for the storage of a plastic medical container holding a medicinal fluid therein, which package comprises a tray part formed by laminating and molding an outer polyolefin layer, an intermediate layer capable of barriering passage of gases and steam, and an inner polyolefin layer in the shape of a tray provided round the opening thereof with a flange portion, a lid member formed by laminating an inner polyamide layer, an intermediate layer capable of barriering passage of gases and steam, and an outer layer of a resin possessed of thermal resistance enough to withstand the conditions of heat seal, and a hotmelt adhesive layer formed of materials of dissimilar melting points including at least one material identical with the polyolefin in one layer of the aforementioned tray part and adapted to be inserted between the aforementioned flange portion of the try part and the corresponding portion of the aforementioned lid member to serve as a medium for the flange portion and the lid member to be heat sealed peel openably.

The present invention further embraces the package wherein the polyolefin layers forming part of the tray is made of polypyropylene and the hotmelt adhesive layer is made of a blend of polyethylene with polypropylene. This invention also embraces the package wherein the weight ratio of polyethylene and polypropylene in the hotmelt adhesive layer is in the range of 20:80 to 50:50. This invention embraces the package wherein the intermediate layer of the lid member capable of barriering passage of gases and steam is made of polyvinylidene chloride or ethylene-vinyl alcohol copolymer. It also embraces the package wherein the intermediate layer of the tray part which is capable of barriering passage of gases and steam is made of ethylene-vinyl alcohol copolymer. It further embraces the package wherein the resin possessed of thermal resistance enough to withstand the conditions of heat sealing is polyester, polyamide or polypropylene. This invention also embraces the package wherein at least the tray part is made of a material possessed of transparency.

PREFERRED EMBODIMENT OF THE INVENTION

Figure 1:
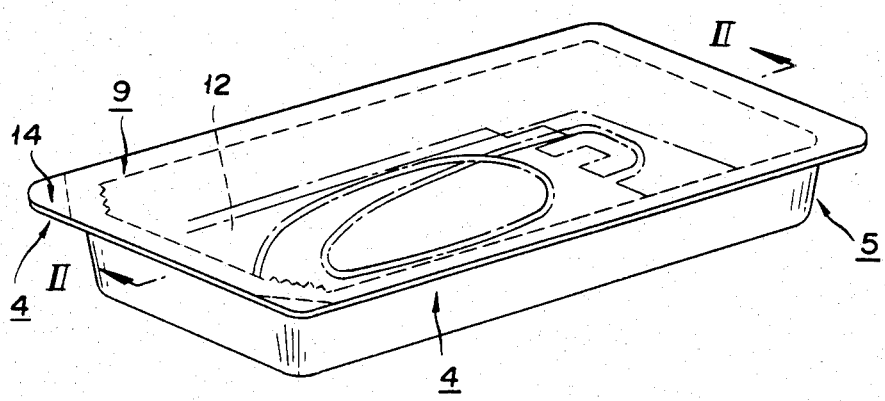
FIG. 1 is a perspective view illustrating a typical package for the storage of a medical container according to the present invention.
Figure 2:
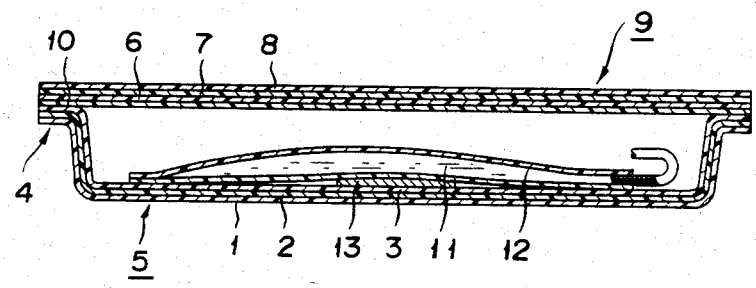
FIG. 2 is a cross section taken along the line II—II in the diagram of FIG. 1.

Now, one preferred embodiment of this invention will be described below with reference to the accompanying drawing. The package of the present invention for the storage of a plastic medical container holding a medicinal fluid therein is produced, as illustrated in FIGS. 1–2, by preparing a tray part 5 provided round the opening thereof with a flange portion 4 by molding a laminated sheet comprising a polyolefin layer (outer layer) 1, a layer capable of barriering passage of gases and steam (intermediate layer) 2, and a polyolefin layer (inner layer) 3, separately preparing a lid member 9 formed by laminating a polyamide layer (inner layer) 6, a layer capable of barriering passage of gases and steam (intermediate layer) 7, and a layer possessed of thermal resistance enough to withstand the conditions of heat sealing (outer layer) 8, also preparing a hotmelt adhesive layer 10 comprising a plurality of materials having dissimilar melting points and including at least one material identical with the polyolefin in one of the layers of the tray part 5, and tightly heat sealing the flange portion 4 of the tray part 5 and the corresponding portion of the lid member 9 through the medium of the hotmelt adhesive layer 10 peel openably.

Examples of the polyolefin which forms the outer layer 1 and the inner layer 3 of the tray part 5 are polyethylene and polypropylene. Polypropylene is preferred because of its excellence in shape-retaining property and thermal resistance over polyethylene. To be used advantageously herein, the polyethylene is required to have a molecular weight of 3,000 to 200,000, preferably 50,000 to 100,000, and the polypropylene to have a molecular weight of 5,000 to 1,000,000 preferably 100,000 to 500,000. The thickness of each of the polyolefin layers is 500 to 600 μm. The intermediate layer 2 of the tray part 5 which is capable of barriering passage of gases and steam is desired to be formed of ethylene-vinyl alcohol copolymer. The thickness of this layer is about 50 μm. The vinyl alcohol content of the copolymer is desired to be 20 to 80 mol%, preferably 40 to 70 mol%. The molecular weight of the copolymer is desired to be 5,000 to 100,000, preferably 10,000 to 50,000.

The hotmelt adhesive layer constituting the inner layer 6 of the lid member 9 is desired to be formed of a blend of polyethylene with polypropylene. The weight ratio of the polyethylene to the polypropylene in the blend, when the outer layer 11 of the tray part 5 is made of polypropylene, is desired to fall in the range of 20:80 to 50:50 from the standpoint of both heat sealability and peel openability of the ray part. The thickness of the inner layer 6 is 30 to 60 μm, preferably 40 to 50 μm. This layer of the blend is superposed by a layer of polyamide, such as, for example, a layer of nylon 6 or nylon-6,6. This nylon layer permits the lid member to retain its strength. The intermediate layer 7 which is capable of barriering passage of gases and steam is desired to be formed of polyvinylidene chloride or ethylene-vinyl alcohol copolymer. Generally, polyvinylidene chloride is used as superposed on a polyolefin film, particularly a biaxially drawn polypropylene film. Generally, the molecular weight of the polyolefin is 5,000 to 1,000,000 preferably 100,000 to 500,000. The thickness of the polyolefin film is 20 to 40 μm. The molecular weight of the aforementioned polyvinylidene chloride is 8,000 to 20,000, preferably 10,000 to 15,000, and the thickness of the polyvinylidene chloride film if 5 to 10 μm. This film exhibits an outstanding ability to barrier passage of gases and steam. A still better barrier property is obtained by using a plurality of such layers capable of barriering passage of gases and steam in a superposed form. To ensure safe storage of a plastic medical container holding a medicinal fluid therein, the intermediate layer 7 is desired to have not more than 1 g/m². 24 hr (40° C., 90% RH), preferably 0.1–0.2 g/m².24 hr (40° C., 90% RH), of per viousness to humidity. To ensure prevention of growth of aerobic microorganisms, the gas barrier property of the intermediate layer 7 is desired to be not more than 0.1%/72 hr, preferably not more than 0.1%/50 hr of oxygen concentration within the package. Examples of the resin of the outer layer which is possessed of thermal resistance enough to withstand the conditions of heat sealing include polyesters such as polyethylene terephthalate and polybutylene terephthalate, polyamides such as nylon 6 and nylon-6,6 and polypropylene. Among other polymers mentioned above, polyethylene terephthalate proves to be particularly desirable. The thickness of the outer layer is 10 to 30 μm, preferably 12 to 25 μm.

The weight ratio of the polyethylene to the polypropylene in the hotmelt adhesive layer is from 20:80 to 50:50 where the inner layer 3 of the tray part 5 is formed of polypropylene and from 80:20 to 50:50 where the inner layer 3 is formed of polyethylene. This is because the seal is peel opened with great difficulty when the proportion in the blend of the material identical with the polyolefin forming the inner layer of the tray part 5 is too high and the adhesiveness of the flange portion and the lid member is insufficient when the proportion is too low.

The medical container to be stored in the package produced by the present invention is a container which holds a medicinal fluid therein. Examples of the medical container for which the package of this invention is advantageously usable include blood bags, transfusion bags, etc. containing therein anticoagulants, fluids for transfusion, and other medicinal fluids such as, for example, ACD-A solution (containing 2.20 g of sodium citrate, 0.80 g of citric acid and 2.20 g of grape sugar in 100 ml of aqueous solution, for example) and CPD solution (containing 0.327 g of citric acid, 2.63 g of sodium citrate, 0.251 g of disodium citrate and 2.32 g of dextrose in 100 ml of aqueous solution, for example) and these bags having their accessories such as tubes, connectors and syringes integrally molded therewith or connected thereto.

The package provided by this invention generally contains a deoxidizer 13 in conjunction with the medical container 12 holding therein a medicinal fluid 11 as described above. The deoxidizer comes in numerous forms. A deoxidizer which comprises at least one compound selected from the group consisting of iron carbide, iron carbonyl, ferrous oxide, ferrous hydroxide and iron silicate and a halogenated metal (containing water when necessary) (Japanese published unexamined Patent No. SHO 54(1979)-37088) and a deoxidizer which is obtained by coating a powdered metal with a halogenated metal (Japanese Published Unexamined Patent No. SHO 54(1979)-35189) are examples.

Storage of such a medical container 12 in the package is accomplished by first stowing the medical container 12 already holding therein the medicinal fluid 11 in position in the tray part 5 which has contained the deoxidizer 13 in advance as required, then applying the lid member 9 through the medium of the hotmelt adhesive layer 10 to the flange portion 4 of the tray part 5, and tightly heat sealing the lid 9 and the flange portion 4 by high frequency or some other heating means. In this case, at least one segment of the corner 14 of the flange portion 4 may be left partially intact by the heat sealing so that this segment will facilitate the peeling of the seal of the package when the medical container is put to use. The aforementioned hotmelt adhesive layer 10 is generally used as superposed fast under application of heat and pressure on the flange 4 of the tray part 5 or on the periphery of the inner layer 6 of the lid member 9. Optionally, the adhesive layer 10 may be superposed on the lid member and extended outwardly and bent downwardly in a semicircular direction enough to seal the lid as wholly wrapped round the entire surface of the flange portion. Otherwise, the adhesive layer may be superposed on the entire surface of the lid member. Of course, the aforementioned deoxidizer may be placed in the in the tray part 5 at the same time that the medical container 12 is placed in the tray part 5 or before the medical container 12 is placed in the tray part 5.

Now, the present invention will be described more specifically below with reference to working examples.

EXAMPLES 1-10

As illustrated in FIGS. 1-2, in a tray part 5 formed of a laminated sheet comprising an outer layer 1 of polypropylene (having a molecular weight of 100,000 to 500,000) 500 $\mu$m in thickness, an intermediate layer 2 of ethylene-vinyl alcohol copolymer (having a molecular weight of 10,000 to 50,000) 50 $\mu$m in thickness, and an inner layer 3 of polypropylene (having a molecular weight of 100,000 to 500,000) 500 $\mu$m in thickness, a pack of deoxidizer held in a bag-like container having one wall thereof made of a gas-pervious sheet of paper was set in the tray part. Further a blood bag 12 made of polyvinyl chloride and containing therein an anticoagulant was set in position in the tray part 5. Then, a lid member 9 obtained by laminating a first layer 6 composed of inner nylon layer 10 $\mu$m in thickness and a high barrier layer 10 $\mu$m in thickness, an intermediate layer 7 composed of two layers each of a film of biaxially drawn polypropylene (having a molecular weight of 100,000 to 500,000) 20 $\mu$m in thickness superposed by a layer of polyvinylidene chloride (having a molecular weight of 10,000 to 15,000) 10 $\mu$m in thickness, and an outer layer 8 of polyethylene terephthalate (having a molecular weight of 100,000 to 500,000) was heat sealed by high frequency to the flange portion 4 of the tray part 5 through the medium of a hotmelt adhesive layer 10 of blend composed of polyethylene (having a molecular weight of 50,000 to 100,000) and polypropylene (having a molecular weight of 100,000 to 500,000) in a weight ratio of 70:30 and superposed in advance on the flange portion 1 of the tray part 5. The packages thus produced were tested for concentration of oxygen contained therein by the use of a zirconia type analyzer (made by Toray Ltd). The results were as shown in Table 1. When the procedure described above was repeated by using ethylene-vinyl alcohol copolymer as the material for the layer of the lid member capable of barriering passage of gases and steam, there were obtained similar results.

TABLE 1

| Example No. | Oxygen concentration (% by volume) | | | | |
|---|---|---|---|---|---|
| | After 24 hrs | After 33 hrs | After 48 hrs | After 53 hrs | After 57 hrs |
| 1 | 110 | 6.5 | 0.153 | 0.075 | 0.0038 |
| 2 | — | 6.8 | 0.264 | 0.042 | — |
| 3 | — | 7.3 | 0.065 | 0.038 | — |
| 4 | — | — | 0.072 | 0.032 | — |
| 5 | — | — | 0.283 | 0.041 | — |
| 6 | — | — | 0.156 | 0.011 | — |
| 7 | — | — | 0.090 | 0.024 | — |
| 8 | — | — | 0.017 | 0.012 | — |
| 9 | — | — | 0.013 | 0.023 | — |
| 10 | — | — | 0.061 | 0.017 | — |

As described above, the package of this invention for the storage of a medical container is obtained by preparing a tray part provided round the opening thereof with a flange portion by molding a laminated sheet comprising a polyolefin layer, a layer capable of barriering passage of gases and steam, and a polyolefin layer, separately preparing a lid member formed by laminating a polyamide layer, a layer capable of barriering passage of gases and steam and a layer possessed of thermal resistance enough to withstand the conditions of heat sealing, also preparing a hotmelt adhesive layer, and tightly heat sealing the flange portion 4 or the tray part and the corresponding portion of the lid member through the medium of the hotmelt adhesive layer peel openably. Because of the inner and outer polyolefin layers, the tray part enjoys high shape-retaining property and transparency. By using a layer of ethylene-vinyl alcohol copolymer as the layer capable of barriering passage of gases and steam, the tray part combines transparency and a high ability to barrier passage of gases (including oxygen) and steam. Since the lid member is constructed as described above, it acquires a high ability to barrier passage of gases and steam because polyvinylidene chloride or ethylene-vinyl alcohol copolymer constituting the intermediate layer by nature is capable of barriering passage of gases and steam. When polyester, polyamide or polypropylene is selected as the resin for the outer layer required to withstand the conditions of heat sealing, the lid member acquires an ample shaperetaining property in spite of the conditions of heat sealing. Since all these layers are transparent, the condition of the medical container held inside the package can be readily inspected without opening the package. When polypropylene is selected for the polyolefin layers in the tray part and a blend of polyethylene with polypropylene is selected for the hotmelt adhesive layer, with the weight ratio of polyethylene to polypropylene falling in the range of 20:80 to 50:50, the package acquires ample adhesive strength and excels in peel openability.

Even when the package of this invention contains for storage a medical container such as a blood bag or transfusion bag made of a material such as polyvinyl chloride which is highly pervious to steam and containing an anticoagulant, a fluid for transfusion or other similar medicinal fluid, it excels in ability to barrier passage of gases and, therefore, prevents oxygen in the ambient air from penetrating into the therapeutic container. Particularly when the deoxidizer is contained simultaneously with the medical container in the package, the interior of the package can be retained in a substantially oxygen-free condition and the medicinal fluid in the medical container is perfectly free from oxidative deterioration.

If aerobic microorganisms by chance find their way into the medical container, they are not allowed to attain growth in the absence of oxygen. The package, accordingly, can keep its interior in a substantially sterilized condition. Further the package defies leakage of steam in both directions because it is highly capable of barriering passage of steam. The steam which oozes out of the aforementioned medical container is only allowed to saturate the interior of the package and is not allowed to escape from the package. Thus, the medicinal fluid in the medical container is not lost while the container is stored in the package. By having at least the tray part of the package formed of transparent layers, the medical container stored inside the package can be inspected for its condition without opening the package.

What is claimed is:

1. A package containing (i) a plastic medical container and (ii) a deoxidizer, said medical container containing a medicinal fluid which will degrade when contacted with oxygen gas and said container being made of a material which is pervious to gases and steam, said package comprising:

a tray part having an opening and comprising a laminated structure including an outer polypropylene layer, an intermediate layer capable of barriering passage of gases and steam and and inner polyolefin layer, and a flange portion around said opening;

a lid member having a laminated structure including an inner polyamide layer, an intermediate layer capable of barriering passage of gases and steam and an outer layer of a resin having a thermal resistance sufficient to withstand the condition of heat sealing;

said intermediate layers being substantially impervious to steam so that the steam which permeates from the medical container is retained within the package whereby the atmosphere in the package may be saturated with said steam; and a hotmelt adhesive layer formed of a blend of polyethylene and polypropylene, said hotmelt adhesive layer being inserted between said flange portion of said tray part and said lid member, said flange portion and said lid member being peel openably heat sealed to each other in a said hotmelt adhesive layer.

2. The package of claim 1, wherein the weight ratio of polyethylene to polypropylene in the hotmelt adhesive layer is in the range of 20:80 to 50:50.

3. The package of claim 1, wherein said intermediate layer of said lid member is formed of polyvinylidene chloride or an ethylene-vinyl alcohol copolymer.

4. The package of claim 1, wherein said intermediate layer of said tray is formed of an ethylene-vinyl alcohol copolymer.

5. The package of claim 1, wherein the resin of the outer layer of said lid member is selected from the group consisting of polyester, polyamide and polypropylene.

6. The package of claim 1, wherein at least one of said tray and said lid member is transparent.

7. The package of claim 1, wherein the intermediate layer of said tray part is pervious to humidity in an amount of 0.1–0.2 g/m$^2$.24 hr.

8. The package of claim 1, wherein the gas barrier property of said intermediate layers is sufficient to limit the oxygen concentration in the package to no more than 0.1% by volume when said tray has been heat-sealed for 72 hours.

9. The package of claim 8, wherein the gas barrier property of said intermediate layer is sufficient to limit the oxygen concentration in the package to no more than 0.1% by volume when said tray has been heat-sealed for 50 hours.

10. The package of claim 1, wherein said plastic medical container is a blood bag or a transfusion bag.

11. The package of claim 1, wherein
the weight ratio of polyethylene to polypropylene in the hotmelt adhesive layer is in the range of 20:80 to 50:50;
said intermediate layer of said lid member is formed of polyvinylidene chloride or an ethylene-vinyl alcohol copolymer;
said intermediate layer of said tray is formed of an ethylene-vinyl alcohol copolymer; and
the resin of the outer layer of said lid member is selected from the group consisting of polyester, polyamide and polypropylene.

12. The package of claim 11, wherein
the intermediate layer of said tray part is pervious to steam in an amount of 0.1–0.2 g/m$^2$.24 hr measured at a temperature of 40° C. and a relative humidity of 90%; and
the gas barrier property of said intermediate layer is sufficient to limit the oxygen concentration in the package to no more than 0.1% by volume when said tray has been heat-sealed for 50 hours.

13. The package of claim 12, wherein at least one of said tray and said lid member is transparent and wherein said plastic medical container is a blood bag or a transfusion bag.

14. The package of claim 1, wherein
the intermediate layer of said tray part is pervious to steam in an amount of 0.1–0.2 g/m$^2$.24 hr measured at a temperature of 40° C. and a relative humidity of 90%; and
the gas barrier property of said intermediate layer is sufficient to limit the oxygen concentration in the package to no more than 0.1% by volume when said tray has been heat-sealed for 72 hours.

15. The package of claim 1, wherein the intermediate layers are pervious to steam in an amount of not more than 1 g/m$_2$.24 hrs measured at a temperature of 40° C. and a relative humidity of 90°.

16. The package of claim 1, wherein at least one segment of the corner of the flange portion may be left partially intact by heat sealing.

* * * * *

UNITED STATES PATENT AND TRADEMARK OFFICE
CERTIFICATE OF CORRECTION

PATENT NO. : 4,537,305
DATED : August 27, 1985
INVENTOR(S) : Nobuyasu TAKANASHI

It is certified that error appears in the above-identified patent and that said Letters Patent is hereby corrected as shown below:

COLUMN 2, line 37, change "try" to --tray--;

COLUMN 3, line 53, change "ray" to --tray--;

COLUMN 4, line 10, change "per viousness" to
--perviousness--;

COLUMN 5, line 21, delete "in the" (second occurrence);

COLUMN 6, line 6, second column from the left, change
"110" to --11.0--;

COLUMN 6, line 45, change "shaperetaining" to
--shape-retaining--;

COLUMN 7, (claim 1), line 26, change "and" (second
occurrence) to --an--.

Signed and Sealed this

Twenty-fourth Day of June 1986

[SEAL]

Attest:

DONALD J. QUIGG

Attesting Officer    Commissioner of Patents and Trademarks